Figure 4:
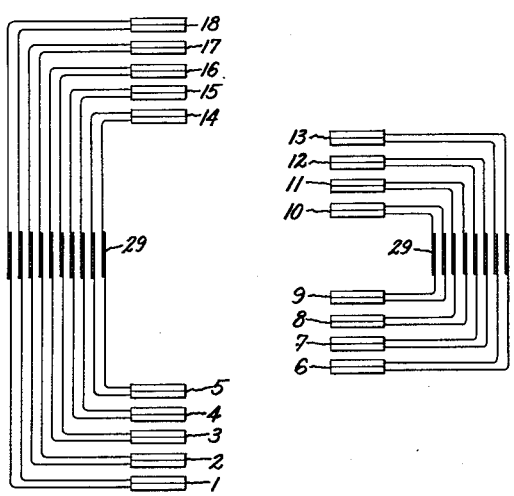

July 3, 1951
P. L. ALGER
2,559,335
DYNAMOELECTRIC MACHINE WINDING
Filed April 14, 1950
3 Sheets-Sheet 1
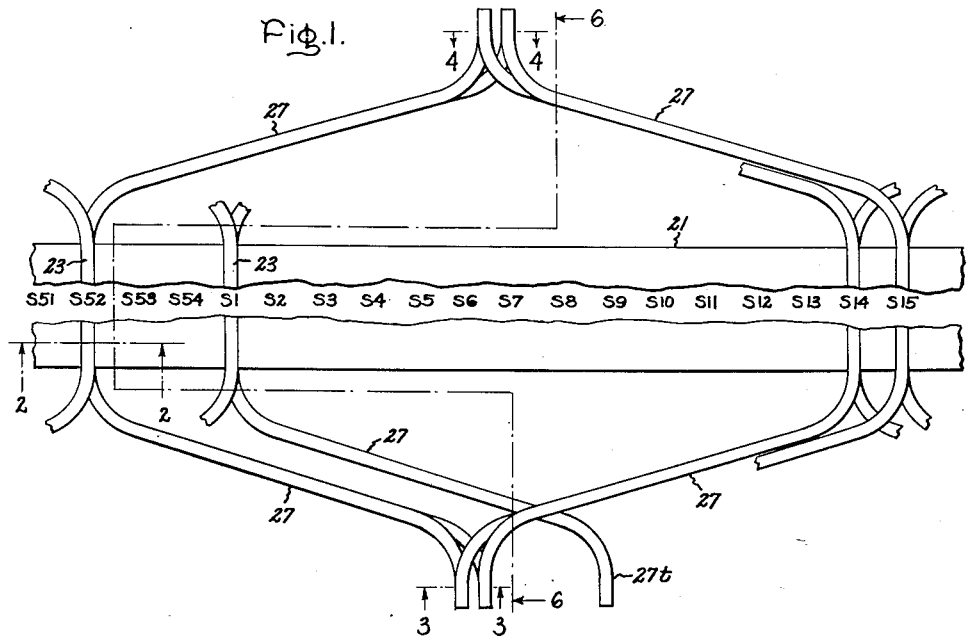
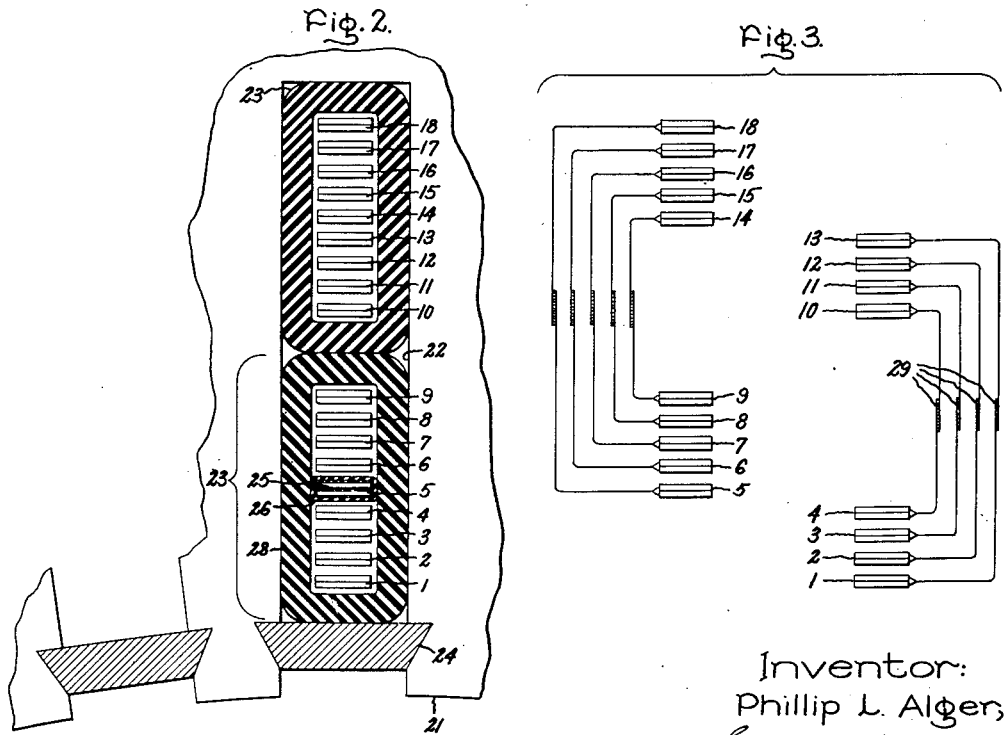
Inventor:
Phillip L. Alger,
by Ernest H. Britton
His Attorney.

July 3, 1951  P. L. ALGER  2,559,335
DYNAMOELECTRIC MACHINE WINDING
Filed April 14, 1950  3 Sheets-Sheet 2

Inventor:
Phillip L. Alger,
by Ernest C. Britton
His Attorney.

July 3, 1951  P. L. ALGER  2,559,335
DYNAMOELECTRIC MACHINE WINDING
Filed April 14, 1950  3 Sheets-Sheet 3

Inventor:
Phillip L. Alger,
by Ernest C. Britton
His Attorney.

Patented July 3, 1951

2,559,335

UNITED STATES PATENT OFFICE 2,559,335

DYNAMOELECTRIC MACHINE WINDING

Philip L. Alger, Schenectady, N. Y., assignor to General Electric Company, a corporation of New York Application April 14, 1950, Serial No. 156,025

7 Claims. (Cl. 171—252)

My invention relates to dynamoelectric machine windings and has significance in connection with the arrangement of conductors in armature windings of relatively large current rating, particularly where the windings are adapted to carry alternating current.

In large dynamoelectric machines in which the windings disposed in slots consist of conductors of considerable depth, magnetic flux across the slots gives rise to unequal loading and to eddy currents within the conductors with a consequent inefficient use of copper. Since this effect is due to the difference in induced voltage at the bottom of the slot from that at the top of the slot, it is a well-known practice to divide the conductors into layers and progressively transpose the layers so that a layer which first occupies the bottom of one slot occupies successively different positions in the same or other slots. In large machines in which it is necessary to thus have the conductors divided into many layers or sections, it is known to make the transpositions either within the slots or externally therefrom in the end turns or at the end connections. Transpositions within the slots are difficult and expensive to make and consume an inordinate amount of space, and transpositions externally of the slots, such as at the end connections, have heretofore involved complicated twisting, or separate connecting pieces, or other intricate mechanical arrangements at the end connections which become impractical when many transpositions are to be made for each deep bar conductor. With the modern trend toward large size A. C. motors and toward generators of great capacity (especially with automatic reclosing after a fault) there are many problems in designing the A. C. machine windings to adapt them for much higher currents and short circuit forces than heretofore, and transposition difficulties are not the least of these problems.

It is an object of the present invention to provide a dynamoelectric machine winding having all transpositions required to avoid eddy current losses made by directly joining the end connections without twisting.

It is a further object of the present invention to provide simple and inexpensive means for transposing a multiplicity of strands of a one-strand wide coil side, thereby to minimize voltage gradient between strands while allowing maximum stiffness of the coil ends and maximum ease of assembly.

A still further object of the present invention is to provide a dynamoelectric machine having efficient utilization of slot cross section area by a low cost, high quality dynamoelectric machine winding having characteristics of low loss, high current carrying capacity, high mechanical resistance to short circuit stresses, and high margin of insulation strength.

Broadly, the means employed in the embodiments herein illustrated and described comprises a dynamoelectric machine with a stationary amature type winding having one-strand wide multi-strand conductors occupying the full width through the winding slots, with front end connections for affecting transposition comprising an arrangement wherein the end of a coil side is bifurcated into two groups of an unequal number of strands integrally connected to strands of corresponding groups of another coil side. In this manner, a very high stiffness under the transverse forces of short circuit is provided, while at the same time the coil sides are easy to form and to connect one with the other.

Figure 6:
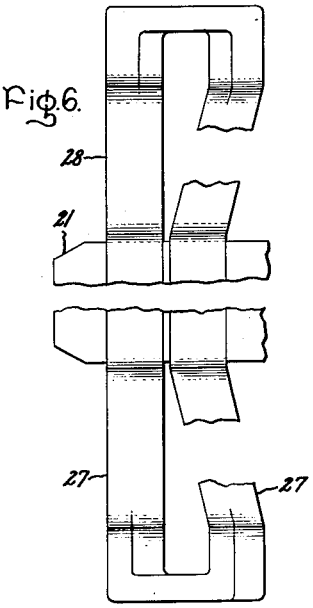
Figure 5:
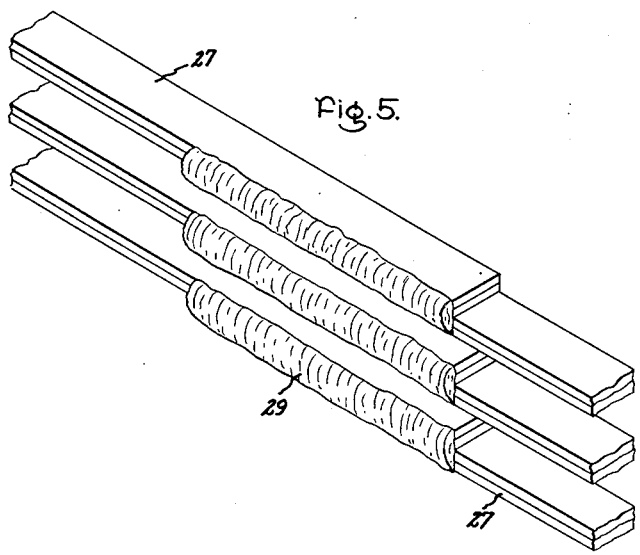
Figure 7:
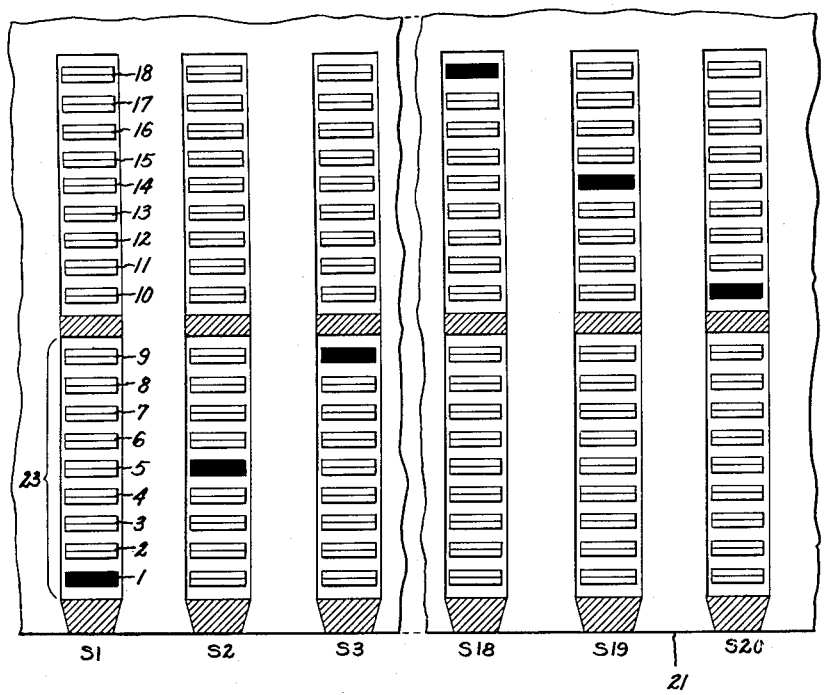
Figure 8:
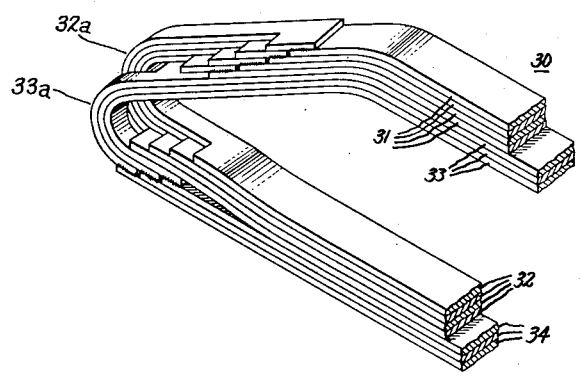

Other objects and advantages will become apparent and my invention will be better understood from consideration of the following description taken in connection with the accompanying drawing in which Fig. 1 is a diagrammatic plan view of an armature coil having unsymmetrical integrally connected end connections in accordance with the invention; Fig. 2 is a slot cross-sectional view taken on the line 2—2 of Fig. 1; Fig. 3 is a diagrammatic view showing the transposing end connections at the front end (along line 3—3) of Fig. 1; Fig. 4 is a diagrammatic view showing back end connections; Fig. 5 is a perspective view showing edge welds for integrally connecting together the front end connections diagrammatically illustrated in Fig. 3; Fig. 6 is a diagrammatic longitudinal section taken on the line 6—6 of the development shown in Fig. 1; Fig. 7 is a diagrammatic representation to show the relationship between successive cross-sections of the twin strands originally occupying position 1 at slot S—1; and Fig. 8 is a perspective view of a modified arrangement.

Referring to the drawing, 21 represents a dynamoelectric machine stator core having fifty-four winding slots 22 (Fig. 2) of which nineteen slots (numbered S—1-S—15 and S—51-S—54), are indicated on the development view of Fig. 1. The fifty-four slot core is provided with a winding (such as with a two-pole, three-phase arrangement with nine one-turn coils in series per phase belt) having two coils sides 23 in each slot. For clarity, only a very few of the coil sides are shown in Fig. 1. As shown in Fig. 2, the two coil sides or bars 23 located in each slot each comprise a plurality of strands. For the purpose of effecting the transposition of the invention, it is preferable that this plurality of strands comprise an odd number, or a multiple of an odd number, such as the eighteen strands arranged as nine twin strands and shown making up one coil side or bar 23 in the slot 22 of Fig. 2. The nine twin strand arrangements may be regarded as nine laminations occupying positions numbered 1—9 for the one coil side and numbered 10—18 for the coil side which happens to be at the top of Fig. 2 (although nearest the so-called "bottom" of the slot). The two coil sides in each slot are held in place by a conventional slot wedge member 24.

As shown for the twin strands at position 5 in Fig. 2, each individual strand may be individually insulated in usual manner such as with glass fiber 25 and two such strands then wrapped together as a twin with insulating tape 26. The twin conductors already taped may then be cut to a length sufficient to provide both the slot portion 23 and front and back end connecting portions 27 (Fig. 1) and then readily formed by bending. After the bending, the nine twin assemblies may then be provided with an outer or slot insulation 28 (Fig. 2) over all except the far ends of the end connections which are separately insulated after the end interconnections are made as hereinafter described.

Of course, the bars in some of the slots (such as the bottom bar from slot S—1 and having the end connection designated 27t on Fig. 1) will be used to make the external connections (for the phase belt) rather than to interconnect at points of transposition with bars from another slot a coil pitch away. However, at the points of transposition, the odd or odd multiple number of laminations extending through the end connections are separated at the end thereof into two unequal parts separately connected to the laminations of the corresponding end connections above or below. As suggested in Fig. 1 and diagrammatically illustrated in Fig. 3, the lamination positions 1—4 of the front end connecting portion 27 from the lower tier of slot S—52 are both circumferentially and radially displaced from the lamination positions 5—9 of the same end connecting portion. Four lamination positions 10—13 of the end connecting portion 27 from slot S—14 (upper tier) are located radially over strands 1—4 and interconnected therewith while the five twin strands from lamination positions 14—18 of slot S—14 (upper tier) are placed radially over the five strands from the other end connecting portion and these strands radially over each other are also interconnected. The arrangement just described (assumed to be at the front end) could be applied to either end of the coils and at the other end each strand of an upper bar may be individually connected to the corresponding strand of a lower bar in inverted sequence (i. e. flopped over) as in conventional practice. In Figs. 1 and 4, I have shown an unequal number of laminations peripherally (as well as radially) separated at the back end merely to reduce the axial depth of the coil connections which might be excessive if all of the connections were made through the same radial plane. With the arrangements shown, at each end of the machine, the interconnections may be made by brazing or welding or otherwise directly and integrally uniting the laminations of a bottom bar to those of a top bar. To facilitate connections in a minimum space and to obtain a fully adequate high temperature connection, the bars may be welded down a thin edge on one side of the coil connections, as shown in Fig. 5, extending the weld 29 to a length suitable for conductivity and mechanical strength. I have found that inert arc welding, such as with a tungsten electrode surrounded by helium gas flow, is very suitable for this purpose.

To save space and welding time, it is feasible to carry two strands together through some of the connections, and thus at the front end (as shown in Figs. 3 and 5) the twin strands of each twin conductor are welded together to the corresponding twin strands of another bar. I have found that this arrangement does not appreciably increase circulating current losses when (as indicated in Fig. 4) the back end strands are all separately connected.

After the end interconnections are made, they may be separately taped or otherwise insulated and the completed construction will appear as indicated by Fig. 6.

The arrangement of strands in the successive coil sides may be clearly understood by reference to Fig. 7 which shows in a straight line development a series of successive coil side cross sections (neglecting the effect of the separate connections of each conductor of each pair of twins at the back end). At slot S—1 the twin strand at position 1 is shown in black. In accordance with the back end arrangement (Figs. 1 and 4) at slot S—18 this same twin strand occupies position 18, and, in accordance with the front end transposing connection of the invention (Figs. 1 and 3), at slot S—2 the same twin strand occupies position 5. In this manner, the twin may be traced from its origin at 27t, successively through positions 1—18—5—14—9—10—4—15—8—11—3—16—7—12—2—17—6—13, or in other words once through every possible position. In this manner, all the nine different laminations consecutively occupy for equal sections of their length nine layers, thereby affording a perfect transposition without any twisting of the strands either within or outside of the machine slots.

It is possible to eliminate the peripheral spread of end connections of the arrangement shown in Figs. 1, 3, 4 and 6 by the alternative arrangement shown in Fig. 8 in which seven-strand-high coil sides of bars 30 are at the point of crossover divided into two unequal parts vertically. In Fig. 8, the top bar four top strands 31 (from positions 7, 6, 5 and 4, respectively, are interconnected to the bottom bar four top strands 32 (leading to positions 4, 5, 6 and 7, respectively), each of these strands 32 being cut away widthwise for a short length at 32a to leave about half copper section (which is quite permissible since the current carrying capacity of any strand is not appreciably reduced by a short length of reduced section). The remaining sections (comprising in the illustrated embodiment, top bar bottom strands 33 cut away for about a half width at 33a and integrally joined as by welding or brazing to bottom bar strands 34) are displaced over the space left vacant by the first mentioned half sections at 32a. Thus, the strand which was originally in position 1 (top bar 30) is next in position 3, number 2 is in number 2 position, number 3 in number 1, number 4 becomes number 7, number 5 becomes number 6, 6 becomes 5 and 7 becomes 4.

These are thus provided arrangements capable of meeting the objects hereinabove set forth. According to the invention, strands may be of full width (thus producing about five times as great a stiffness under transverse forces as would be the case with a two-strand wide bar of the same overall width of copper plus separator and thus affording a maximum utilization of space in the slot). The arrangements of the invention are easy to make because, unlike arrangements which require transposing in the slots or twisting at the end connections, the insulation covering is substantially undisturbed during assembly. Unlike arrangements which require a special clip or other mechanical connecting piece to join strands at their end connections, there is practically no limit to the number of strands or laminations which may be separately transposed in any desired manner to provide a perfect progressive transposition which affords minimum copper loss, high strength and equal loading of all strands during operation. Since the transposition is not merely between adjacent positions in adjacent coils (but is, for example, from position 1 in S—1 to position 5 of S—2, as in Fig. 7) the voltage gradients are minimized in a very effective manner for the whole of any winding embodying the invention.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirt and scope of my invention.

What I claim as new and desire to secure by Letters Patent of the United States is:

1. In a dynamoelectric machine core provided with winding slots, an armature winding having a plurality of coil sides each having a slot portion occupying substantially the full width of one of said winding slots, and each having an end connecting portion extending from the respective slot at a first end of said core and terminating in two groups of an unequal number of strands, said winding having transposing connections comprising strands of one of said groups of a first coil side integrally connected in inverted sequence to a corresponding group of another coil side and comprising strands of the other of said groups of said first coil side integrally connected in inverted sequence to the other group of said other coil side.

2. In a dynamoelectric machine having an annular core provided with winding slots, a winding comprising a plurality of coil sides arranged two coil sides per slot, said coil sides each comprising a plurality of insulated laminations each occupying substantially the full width of the respective slot and extending therefrom through a formed end connecting portion of the respective coil side, said winding having transpositions made at end connecting portions each divided at its ends into two groups of an unequal number of laminations, with each lamination of each of the two groups integrally connected to a lamination of a corresponding group of another coil side.

3. A dynamoelectric machine armature winding comprising one-strand-wide multilayer conductors each having an end portion bifurcated into two groups comprising a first group of $n$ layers and a second group of $n+1$ layers, and layer transposing interconnections each comprising integrating interconnections between respective layers of first groups of a pair of said conductors and integrating interconnections between respective layers of second groups of the same pair of conductors, whereby said winding may be easily formed with high stiffness with transverse forces of short circuit and with all transpositions required to avoid eddy current losses.

4. An alternating current dynamoelectric machine winding comprising bar sections each having a plurality of strands arranged generally one above the other, said winding having transpositions each made at one end of two bar sections which at said end are each parted vertically into two groups of an unequal number of strands directly joined to strands of corresponding groups of the other bar section in two different vertical planes.

5. An armature coil having unsymmetrical end connections each comprising a plurality of individually insulated laminations of flat cross section, said unsymmetrical end connections each separated at the end thereof into two parts of an unequal number of laminations separately connected to the laminations of two unequal parts of a similar end connection with the two unequal parts of each end connection circumferentially and radially displaced from each other and radially displaced from the corresponding part of the other end connection, with the interconnections between laminations of different end connections comprising a weld extending along the thin edges thereof to a length suitable for conductivity and mechanical strength.

6. An A. C. dynamoelectric machine having a stationary annular armature core provided with slots and a winding having two coil sides in each of said slots and extending therefrom to provide upper and lower tier end connections, said coil sides each comprising a one strand wide pile of odd or odd multiple number of strands periodically transposed from one coil side to another by having upper and lower tier end connections from different slots each divided into two radially and peripherally displaced groups of strands with a different number of strands in each of the two groups associated with one coil side, and with each respective group peripherally aligned with a corresponding group of the same number of strands associated with the other coil side, and an integral interconnection directly joining the strands of groups of like number of strands by carrying them over in inverted sequence in each radial plane.

7. A transposition arrangement for a dynamoelectric machine winding having a multilayer upper tier end connecting portion and a multilayer lower tier end connecting portion, said end connecting portions having vertically superposed ends each comprising vertically divided top and bottom groups of a different number of layers, said transposition arrangement comprising at one lateral half thereof substantially half width continuations of top group layers of one of said end connecting portions directly connected in inverted sequence to top group layers of the other of said end connecting portions and at the other lateral half of said transposition arrangement substantially half width continuations of bottom group layers of one of said end connecting portions directly connected in inverted sequence to bottom group layers of the other of said connecting portions.

PHILIP L. ALGER.

REFERENCES CITED

The following references are of record in the file of this patent:

UNITED STATES PATENTS

| Number | Name | Date |
|---|---|---|
| 957,882 | Hensley | May 17, 1910 |
| 2,085,099 | Jones | June 29, 1937 |